Sept. 21, 1943.   E. B. ANGOLD   2,329,973
BALL BEARING OF THE COMBINED JOURNAL AND THRUST TYPE
Filed Jan. 2, 1942

Inventor
E. B. Angold:
by
W. E. Evans:
Attorney

Patented Sept. 21, 1943

2,329,973

UNITED STATES PATENT OFFICE 2,329,973

BALL BEARING OF THE COMBINED JOURNAL AND THRUST TYPE

Edward Barnabas Angold, Streatham Vale, London, England, assignor of one-half to United Gas Industries Limited, London, England, a company of Great Britain Application January 2, 1942, Serial No. 425,434
In Great Britain August 26, 1940

7 Claims. (Cl. 308—233)

The invention relates to ball bearings of the combined journal and thrust type adapted for use in gyroscopes and other appliances or instruments having parts that are required to rotate freely.

The invention has among its objects to improve the coasting time or capacity for free running of such bearings, to provide a bearing which will not be affected by extremes of temperature and is therefore suitable for use upon aircraft, and more particularly to provide a bearing that is suitable for use in gyroscopes and other mechanism involving parts that are required to rotate rapidly.

The invention consists in mounting the balls that are adapted to support the journal between concentric cylindrical surfaces formed respectively upon the journal and upon the fixed member of the bearing, the said surfaces being limited by plane surfaces normal to the axis of rotation of the journal and provided respectively upon the spindle or shaft of which the journal forms part and upon the said member, and in disposing a thrust ball or balls between a plane surface formed at or towards the end of the journal and a plane surface formed in the fixed member of the bearing as the end wall of a cylindrical recess the wall of which recess serves as a running surface for the thrust ball or balls.

By the use of the cylindrical bearing surfaces and by suitable disposition of the plane surfaces the balls of the journal bearing may be permitted slight lateral movement since they are guided by the said normal surfaces and they are not restricted to a defined path as is the case in bearings provided with recess of the cup or curved type.

The recess provided for the thrust ball is advantageously of appreciably larger diameter than that of the ball so that the ball may have a true rolling action upon the surface of the recess, while in the case where more than one ball is provided the annular recess in which they are disposed may afford similar clearance.

The fixed member of the bearing may be provided as a unit in which there is formed a centrally disposed cylindrical recess that is in two sections of differing diameters so that a shoulder is provided to serve as the plane surface of the fixed member to co-operate with the balls of the journal bearing. The said member may, however, be formed in sections, for example, in such manner that relative adjustment of disposition of the said sections may be effected for the purpose of varying the disposition of the plane surface that co-operates with the balls of the journal bearing or of the plane surface co-operating with the thrust ball or balls or of both such surfaces with reference to the said member. Thus, the fixed member may be provided as one or more annular parts and as a central plug or part that may be adapted to be engaged one with the other by screw-threaded engagement.

The plane surface normal to the axis of the journal that is required to limit the travel of the balls of the journal bearing in the one direction may be formed by providing the journal as a part of reduced diameter at the end of the spindle or shaft. Alternatively, it may be the lateral face of a collar mounted in suitable disposition upon the spindle. Such collar may be of adjustable position for the purpose of regulating the disposition of the surface normal to the axis of the journal.

The invention further comprises the features hereinafter described.

The invention is illustrated, by way of example, in the accompanying diagrammatic drawing.

Figure 1:
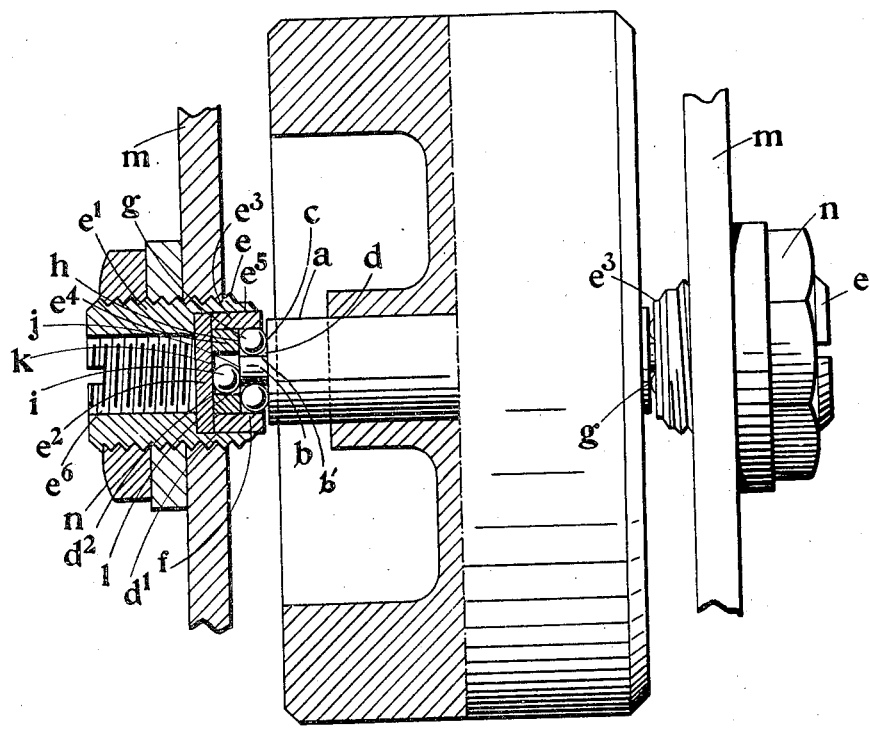
Figure 1 is an elevation of the rotor of a gyroscope and of the spindle bearings partly in section.

In carrying the invention into effect in the production of a combined journal and thrust bearing suitable for use in connection with the spindles of gyroscopes as applied to instruments for use on aircraft, and therefore subject in service to extremes of temperature, as illustrated in Figure 1 of the accompanying drawing, the spindle $a$ of the rotor of the gyroscope is reduced in diameter at each end to form in each case a journal $b$ projecting from a plane surface $c$ normal to the axis of the spindle. Each of the said journals $b$ is disposed centrally within a recess $d$ in the corresponding fixed member $e$ of the bearing, the recess $d$ being formed in two sections $d^1$, $d^2$ that are cylindrical in shape and the outer $d^1$ of which is of greater diameter than the inner $d^2$. The outer recess section $d^1$ is of a diameter to admit between the peripheral surface $b^1$ of the journal $b$ and the cylindrical wall $f$ of the section the balls $g$ by which the journal $b$ is supported, the balls being confined in the axial direction of the spindle $a$ between the plane surface $c$ and the opposed plane surface $h$ normal to the axis of the spindle that is formed by the change in diameter between the two sections $d^1$, $d^2$ of the recess $d$ of the fixed bearing member $e$. The second section $d^2$ of the said recess $d$ serves for the reception of a thrust ball $i$ which is confined between the plane surface $j$ formed by the end of the journal $b$ and the plane surface $k$ formed by the end wall of the recess section $d^2$ and rolls upon the cylindrical wall $l$ of the recess section. The said second section $d^2$ is advantageously of a diameter considerably greater than that of the ball $i$.

In the construction represented in Figure 1, the fixed member $e$ of the bearing comprises a carrier element $e^1$ in which are fitted removable and exchangeable parts $e^2$, $e^3$, $e^4$ upon which are formed the bearing surfaces $f$, $l$ and plane surfaces $h$, $k$. Thus, within a cylindrical recess $e^5$ in the carrier element $e^1$ there is mounted a circular disc $e^2$ adapted to fit at the end of the recess $e^1$ and forming with its outer face the end wall $k$ and, forward of the said disc $e^2$, there is mounted an open-ended cylinder $e^3$ fitting the cylindrical wall of the recess $e^5$ and providing with its inner surface the cylindrical wall or bearing surface $f$, of the outer recess section while a concentric open-ended cylinder $e^4$ fitting within the cylinder $e^3$ and abutting against the outer face of the disc $e^1$ provides the plane surface $h$ and also the rolling surface $l$ for the thrust ball $i$. The carrier element $e^1$ of the free member of the bearing may be mounted, for example, by means of an exterior screw-thread, in the gimbal ring $m$ or part of the instrument or appliance in which the bearings are required to be used and may be locked in the adjusted position by means of a lock nut $n$. The carrier element may be bored and screw-threaded at $e^6$ for the reception of a screwed plug that may serve for the determination of the relative position of the parts $e^2$, $e^3$, $e^4$ in the carrier element $e^1$.

Figure 2:
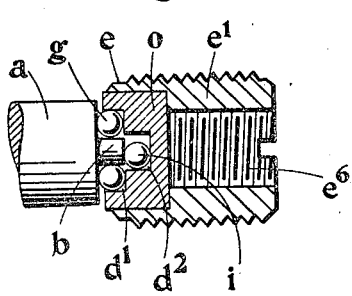
Figure 2 is a sectional elevation of a modified construction of the bearing.

In the construction represented in Figure 2, the fixed member $e$ of the bearing comprises a carrier element $e^1$ and a single removable and exchangeable fitting $o$ in the outer face of which is formed the two sections $d^1$, $d^2$ of the recess $d$ and therefore the bearing surfaces $f$, $l$, and the plane surfaces $h$, $k$. As in the construction represented in Figure 1 a screwed plug may be entered into the screw-threaded bore $e^6$ of the carrier element to determine the position of the fitting $o$.

Figure 3:
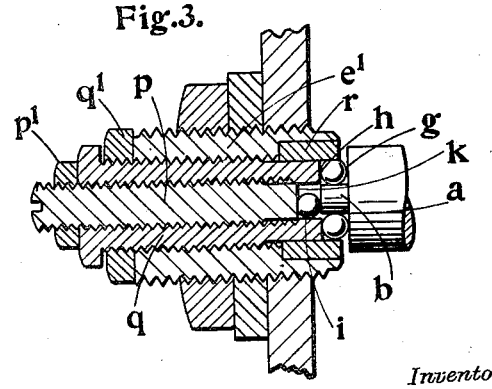
Figure 3 is a sectional elevation of a further modification of construction of the bearing.

In Figure 3 is illustrated a construction in which the plane surfaces $h$, $k$ are provided to be relatively adjustable and for the purpose the plane surface $k$ may be provided by the end of a plug $p$ that is peripherally screw-threaded for the greater part of its length and is received into the screw-threaded bore of a sleeve or bush $q$ the forward part of the bore of which is formed as the rolling surface $l$ for the thrust ball $k$ while the inner annular end face forms the plane surface $h$. The sleeve or bush $q$ is peripherally screw-threaded for the greater part of its length so that it may engage and be received into the screw-threaded bore of the carrier element $e^1$, the forward end of which is formed to present the bearing surface $f$, as, for example, by being recessed for the reception of the open-ended cylindrical fitting $r$. The plug $p$ and the sleeve or bush $q$ are locked in the adjusted position by means of lock nuts $p^1$, $q^1$ respectively.

It will be understood that the plane surface of the spindle may be provided as a lateral face on a collar suitably mounted upon the spindle, such collar being advantageously of adjustable position upon the spindle.

By the construction of combined journal and thrust bearings in the manner hereinbefore described there is afforded a sufficiency of end play to secure complete freedom of running without reducing the efficiency of the mechanism, while at the same time the mechanism is effective without any tendency in the one direction for the bearing to seize and in the other direction for extreme play to develop. It is desirable that the spindle of the rotor should be provided of metal that has a small co-efficient of expansion.

It will be understood that the invention includes the provision of plane surfaces and bearing surfaces that are provided with a slight transverse curvature, and further that the spindle may be hollow and that a plurality of thrust balls may be provided to co-operate with an annular thrust surface on the spindle.

I claim:

1. Ball bearings of the combined journal and thrust type having relatively moving surfaces between which are disposed balls to roll between the said surfaces and serving for the support of rotatable machine and like parts, comprising a bearing journal provided upon the rotatable part and presenting ball-rolling surfaces respectively disposed peripherally and normally to the axis of rotation, the ball-rolling surface normal to the axis of rotation terminating the peripheral ball-rolling surface, a fixed bearing member axially recessed for the reception in spaced relation of the said journal, the axial recess comprising two co-axial sections of differing diameters and of cylindrical form, the peripheral and cylindrical surface of the outer and larger section forming a ball-rolling surface oppositely disposed to and co-operating with the peripheral ball-rolling surface of the journal and the end surface normal to the axis of the inner and smaller section forming a ball-rolling surface oppositely disposed to and co-operating with the ball-rolling surface normal to the axis of rotation of the journal, balls positioned and rolling respectively between the peripheral rolling surfaces of the journal and of the fixed bearing member and between the rolling surfaces normal to the axis of rotation upon the journal and upon the bearing member, the surfaces of the journal and of the bearing member being so relatively disposed as to prevent contact between the balls positioned between the respective pairs of surfaces and a ball guide surface opposed to the end surface normal to the axis of rotation of the outer section of the axial recess of the fixed bearing member, the balls having clearance in the direction normal to the surfaces between which they roll.

2. Ball bearings according to claim 1, having the journal projecting from a surface normal to the axis of rotation, which surface forms the ball guide surface.

3. Ball bearings according to claim 1, having the journal formed with an end surface serving as the ball-rolling surface normal to the axis of rotation and co-operating with the surface normal to the axis of rotation forming the end surface of the inner section of the axial recess of the fixed bearing member, a thrust ball disposed between the said surfaces and rolling upon the cylindrical surface of the said section of the axial recess, the said section being of larger diameter than the diameter of the ball.

4. Ball bearings according to claim 1, wherein the fixed bearing member is provided with a plurality of concentric elements respectively presenting the peripheral rolling surface of the said member and the end surface normal to the axis of rotation of the outer section of the axial recess.

5. Ball bearings according to claim 1, wherein the fixed bearing member is provided with a plurality of concentric elements respectively presenting the peripheral rolling surface of the said member and the end surface normal to the axis of rotation of the outer section of the axial recess, the inner concentric elements presenting also a peripheral ball-rolling surface representing the cylindrical surface of the inner section of the axial recess of the fixed bearing member.

6. Ball bearings according to claim 1, wherein the fixed bearing member is provided with a plurality of concentric elements respectively presenting the peripheral rolling surface of the said member and the end surface normal to the axis of rotation of the outer section of the axial recess, the inner concentric elements presenting also a peripheral ball-rolling surface representing the cylindrical surface of the inner section of the axial recess of the fixed bearing member, and a further axially disposed element presenting a surface normal to the axis of rotation and forming the end surface normal to the axis of the inner section of the axial recess of the fixed bearing member.

7. Ball bearings according to claim 1, wherein the fixed bearing member is provided with at least one movable element presenting the axial recess and with an element relatively movable therein for the adjustment in position of the said element or elements.

EDWARD BARNABAS ANGOLD.